Feb. 8, 1955  G. J. E. EKBERG  2,701,723
HOLDER AND CENTERING DEVICE FOR WORKPIECES
Filed May 28, 1954

INVENTOR:
GUNNAR J. E. EKBERG
By Young, Emery & Thompson
Attys.

United States Patent Office 2,701,723
Patented Feb. 8, 1955

2,701,723

HOLDER AND CENTERING DEVICE FOR WORKPIECES

Gunnar Johan Emanuel Ekberg, Ornskoldsvik, Sweden, assignor to Aktiebolaget Broderna Ekbergs Platslågerifabrik, Ornskoldsvik, Sweden, a joint-stock company Application May 28, 1954, Serial No. 433,241

8 Claims. (Cl. 279—3)

The present invention relates to a holder and centering device for a workpiece that is to be turned when being worked, said device permitting the rapid and convenient fixing and releasing of the workpiece. The device may be applied to all forms of machines in which a workpiece has to be worked while being turned around a centre, as for example, in sheet metal shearing machines for cutting circular pieces of sheet metal, various types of cutting machines, etc., and it is not limited to use when working a certain kind of material but can also be employed for different kinds of materials such as sheet metal, glass, wood, etc.

The holder and centering device according to the present invention comprises a centre-pin and a suction cup member which surrounds and tightly engages the former, said centre-pin being axially displaceable relatively to the suction cup member so that the latter may be moved into contact with the workpiece and hold the same in the position determined by the centre-pin.

The invention will be more particularly described with reference to one form of construction shown in the accompanying drawing by way of example.

Figure 1:
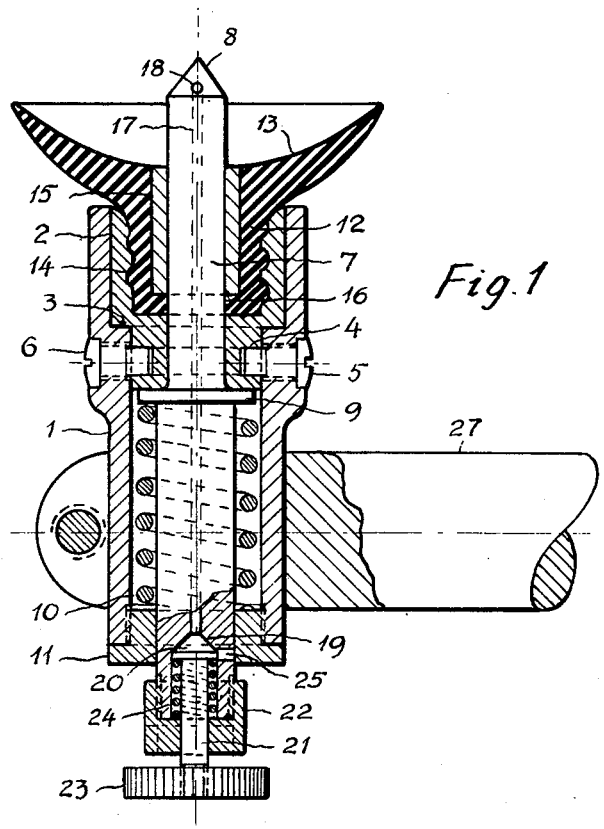
Fig. 1 is an axial cross-section through the holder and centering device.

1 indicates a tubular member which is supported in a suitable manner by the machine to which the centering device is to be employed; in a sheet metal shearing machine for instance by means of one or more rods 27 displaceably arranged in the lower part of the machine frame which rods enable the member 1 to be adjusted at the desired distance from the cutting tool.

In an upper and wider bore in the member 1 a bearing bushing 2 is inserted. The said bushing rests on a shoulder 3 and is provided with an external annular groove 4 in which screws 5, 6 screwed radially into the member 1 engage to prevent axial movement of the bushing 2 but allowing the same to turn.

At the bottom of the bushing 2 a bore is arranged into which a centre-pin 7 with an upper conical point 8 is fitted. The pin is provided with a flange 9. A helical spring 10 is arranged between this flange and a plug 11 screwed into the lower end of the member 1 through which plug the lower end of the pin projects, and the spring 10 tends to maintain the flange 9 in contact with the bearing bushing 2, as shown in Fig. 1.

A shaft portion 12 of a suction cup member 13 of rubber or the like is fixed in the bushing 2. In order to obtain a secure hold for the said shaft portion the bushing 2 may, as shown, be provided internally with a screw thread 14 in which a corresponding external thread on the shaft portion 12 engages. The screw thread may, of course, be replaced by other projections or by another form of the hollow space in the bushing 2, by allowing the same to taper off conically in an upward direction for example. The shaft portion 12 of the suction cup may suitably be cast, using the bushing 2 as a casting mould, and after the insertion of the centre-pin 7 a metal bushing 15 may be inserted between the pin and the shaft portion 12. Under the bushing 15 the rubber in the portion 12 may make tight contact with the pin 7, as shown at 16. Alternatively, special packing rings or the like may be inserted.

An air passage 17 extends longitudinally through the centre-pin 7 and has an opening 18 on the conical point of the pin. At the lower end of the pin the passages 17 expands to form a conical seat 19 for a valve body 20. The valve body 20 is provided with a spindle 21 which passes out through a screwnut 22 at the lower end of the pin and is fitted with a milled knob 23 by means of which the valve body may be removed from its seat against the action of a spring 24, whereupon air flows into the passage 17 through an opening 25 at the side of the pin 1.

Figure 2:
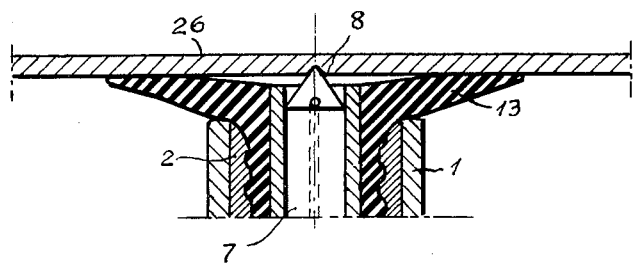
Fig. 2 shows in a similar manner the suction cup according to Fig. 1 in the position for use.

Fig. 2 illustrates a workpiece 26 of sheet metal for example, which is held tight by the suction cup 13 with the point of the centre-pin 7 engaging in a centre point formed in the workpiece. The workpiece is securely held in this position by the suction cup and can be turned together with the latter in the tubular member 1. When it is desired to release the workpiece the valve body 20 is drawn back, whereupon air can flow into the air passage 17.

Various modifications may, of course, be made in the details without departing from the scope of the invention.

What I claim is:

1. A holder and centering device for a workpiece that is to be turned when being worked, comprising a centrepin and a suction cup member which surrounds and tightly engages the former, the centre-pin being axially displaceable relatively to the suction cup member so that the latter may be moved into contact with the workpiece and hold it in the position determined by the centre-pin.

2. A holder and centering device for a workpiece that is to be turned when being worked, comprising a centrepin, a suction cup member which surrounds and tightly engages the former, the centre-pin being axially displaceable relatively to the suction cup member so that the latter may be moved into contact with the workpiece and hold it in the position determined by the centre-pin, and a sleeve-shaped member in which the suction cup member is rotatably mounted.

3. A holder and centering device for a workpiece that is to be turned when being worked, comprising a centrepin, a suction cup member which surrounds and tightly engages the former, the centre-pin being axially displaceable relatively to the suction cup member so that the latter may be moved into contact with the workpiece and hold it in the position determined by the centre-pin, the suction cup member being provided with a shaft portion, a bushing in which said shaft portion is fixed, and a sleeve-shaped member in which the bushing is rotatably mounted.

4. A holder and centering device for a workpiece that is to be turned when being worked, comprising a centrepin, a suction cup member which surrounds and tightly engages the former, the centre-pin being axially displaceable relatively to the suction cup member so that the latter may be moved into contact with the workpiece and hold it in the position determined by the centre-pin, the suction cup member being provided with a shaft portion, a bushing in which said shaft portion is fixed, a sleeve-shaped member in which the bushing is rotatably mounted, and means for preventing axial movement of the bushing in the sleeve-shaped portion.

5. A holder and centering device according to claim 4 in which the said means comprise screws inserted in screwthreaded holes in the sleeve-shaped member, said screws engaging in an annular groove in the bushing.

6. A holder and centering device for a workpiece that is to be turned when being worked, comprising a centrepin, a suction cup member which surrounds and tightly engages the former, said centre-pin being axially displaceable relatively to the suction cup member so that the latter may be moved into contact with the workpiece and hold it in the position determined by the centre-pin, the suction cup member being provided with a shaft portion, a bushing in which said shaft portion is fixed, a sleeve-shaped member in which the bushing is rotatably mounted but secured against axial movement, and a spring inserted in the sleeve-shaped member which spring actuates the centre-pin and tends to displace the latter axially in the suction cup member so that the point of the pin projects beyond the plane through the edge of the suction cup.

7. A holder and centering device for a workpiece that is to be turned when being worked, comprising a centrepin, a suction cup member which surrounds and tightly engages the former, said centre-pin being axially displaceable relatively to the suction cup member so that the latter may be moved into contact with the workpiece and hold it in the position determined by the centre-pin, the suction cup member being provided with a shaft portion, a bushing in which said shaft portion is fixed, a sleeve-shaped member in which the bushing is rotatably mounted but secured against axial movement, and a spring inserted in the sleeve-shaped portion which actuates the centre-pin and tends to displace the latter axially in the suction cup member so that the point of the pin projects beyond the plane through the edge of the suction cup, the centre-pin being provided with an air passage which opens out near the point of the pin and the other end of which is fitted with a manually operable valve.

8. A holder and centering device for a workpiece that is to be turned when being worked, comprising a centre-pin, a metal bushing surrounding and tightly engaging the former, said centre-pin being axially displaceable relatively to the bushing, a suction cup member supported by this metal bushing and provided with a shaft portion, a bushing in which said shaft portion is fixed, a sleeve-shaped member in which said bushing is rotatably mounted but secured against axial movement, and a spring inserted in the sleeve-shaped member which spring actuates the centre-pin and tends to displace the latter axially in the suction cup member so that the point of the pin projects beyond the plane through the edge of the suction cup, the centre-pin being provided with an air passage which opens out near the point of the pin and the other end of which is fitted with a manually operable valve.

References Cited in the file of this patent

UNITED STATES PATENTS

| | | |
|---|---|---|
| 1,147,102 | Knabe | July 20, 1915 |
| 1,990,334 | Koppe | Feb. 5, 1935 |
| 2,198,765 | Featherstone et al. | Apr. 30, 1940 |
| 2,680,994 | Wood | June 15, 1954 |